United States Patent [19]

Kellner et al.

[11] 4,067,596
[45] Jan. 10, 1978

[54] DUAL FLOW PASSAGE DRILL STEM

[75] Inventors: Jackson M. Kellner; Vincent Hugo Vetter, both of Midland, Tex.

[73] Assignee: Smith International, Inc., Midland, Tex.

[21] Appl. No.: 717,628

[22] Filed: Aug. 25, 1976

[51] Int. Cl.² .............................................. F16L 39/00
[52] U.S. Cl. ................................ 285/133 A; 175/215;
 285/175; 285/302; 285/334; 285/381
[58] Field of Search ...................... 285/49, 175, 133 A,
 285/302, 133 R, 334, 138–143, 381, DIG. 11,
 223; 175/215, 320; 65/1 V, 4, 13, 32 R, 27 R;
 267/137

[56] References Cited
U.S. PATENT DOCUMENTS

| | | | |
|---|---|---|---|
| 1,868,400 | 7/1932 | Stover | 175/69 |
| 2,983,533 | 5/1961 | Tisch | 285/DIG. 11 |
| 3,168,334 | 2/1965 | Johnson | 285/223 X |
| 3,208,539 | 9/1965 | Henderson | 175/215 |
| 3,664,441 | 5/1972 | Carey | 285/133 A |
| 3,734,484 | 5/1973 | Hall | 267/137 |
| 3,947,009 | 3/1976 | Nelmark | 175/320 |
| 3,991,834 | 11/1976 | Curington | 175/215 X |
| 3,998,477 | 12/1976 | Delahaye et al. | 285/133 R |
| 3,998,479 | 12/1976 | Bishop | 285/133 A |

Primary Examiner—Dave W. Arola
Attorney, Agent, or Firm—Murray Robinson; Ned L. Conley; David Alan Rose

[57] ABSTRACT

Dual flow passage drill stem has a tube radially supported within a drill pipe by a plurality of metal ribs welded to the middle portion of the tube and by elastomer O-rings mounted in spiders disposed around the tube connectors and seated against outwardly facing shoulders in the pipe tool joints. Axial loads are taken by elastomer rings around the tube connectors clamped between outwardly facing annular rabbets at the inner periphery of each spider and an integral flange on the pin tube connector and a threaded flange screwed onto box tube connector. The tube is preloaded in tension and the pipe and elastomer rings are preloaded in compression. The axial support elastomer rings preferably have hour-glass cross sections to increase their damping effect; in addition, the axial support elastomer rings, as well as the radial support O-rings, are preferably made of neoprene, which has a relatively flat curve of force transmission versus frequency. Desirably the elastomer mounted tube has a resonant frequency different from that of the expected cyclic loading of the pipe, e.g., when employed with a vibratory or hammer drill motor.

25 Claims, 19 Drawing Figures

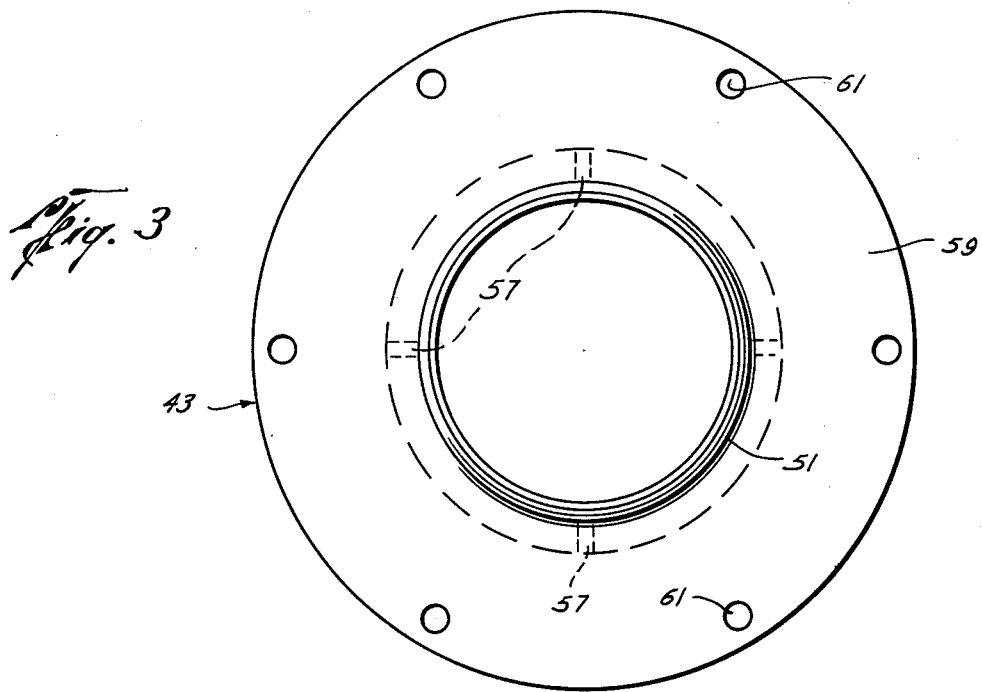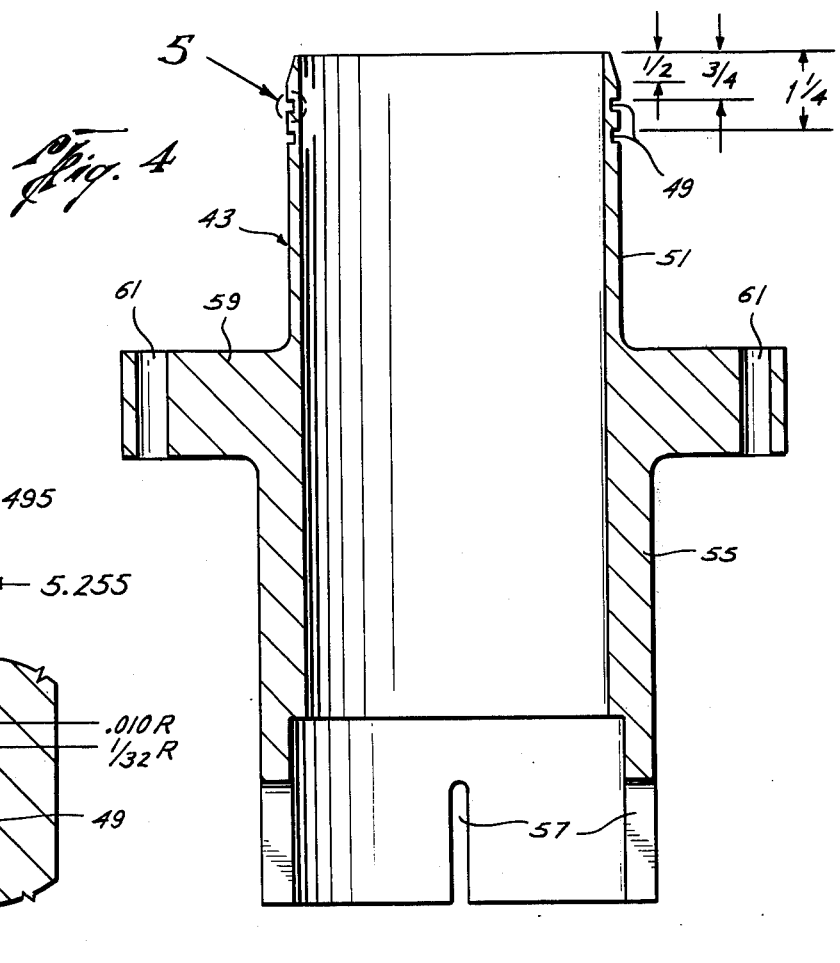

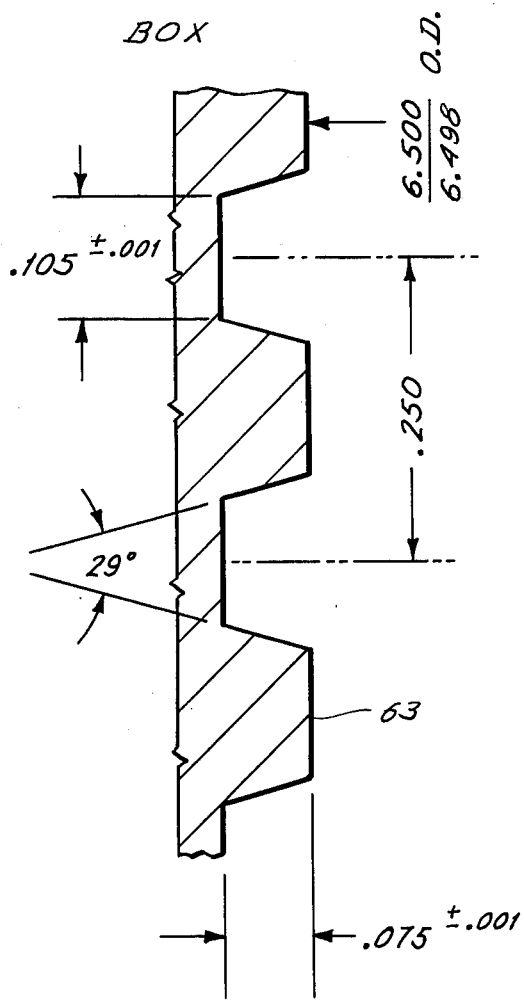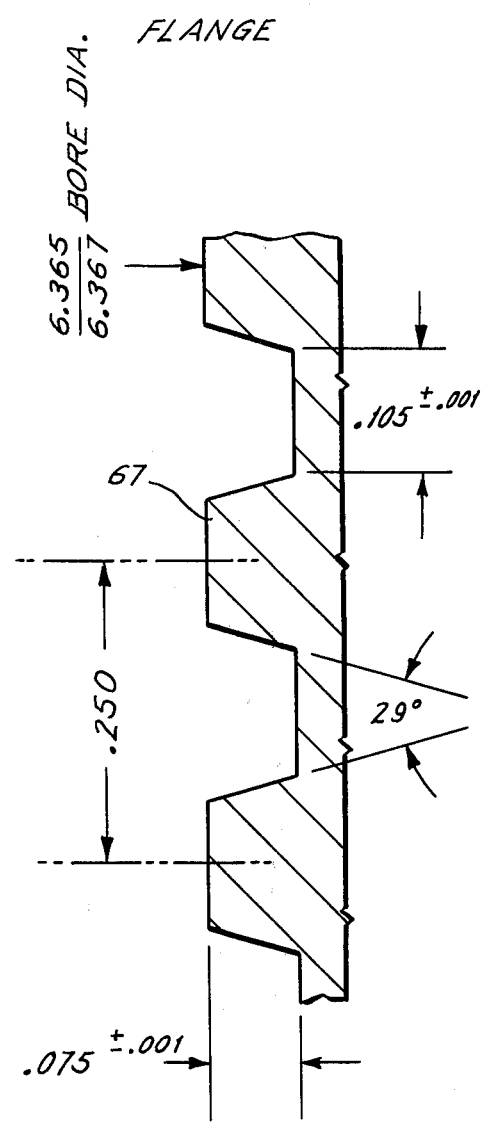
THREAD DETAIL: 6½-4 STUB ACME

CONNECTOR O.D.

SPLIT

SPLIT

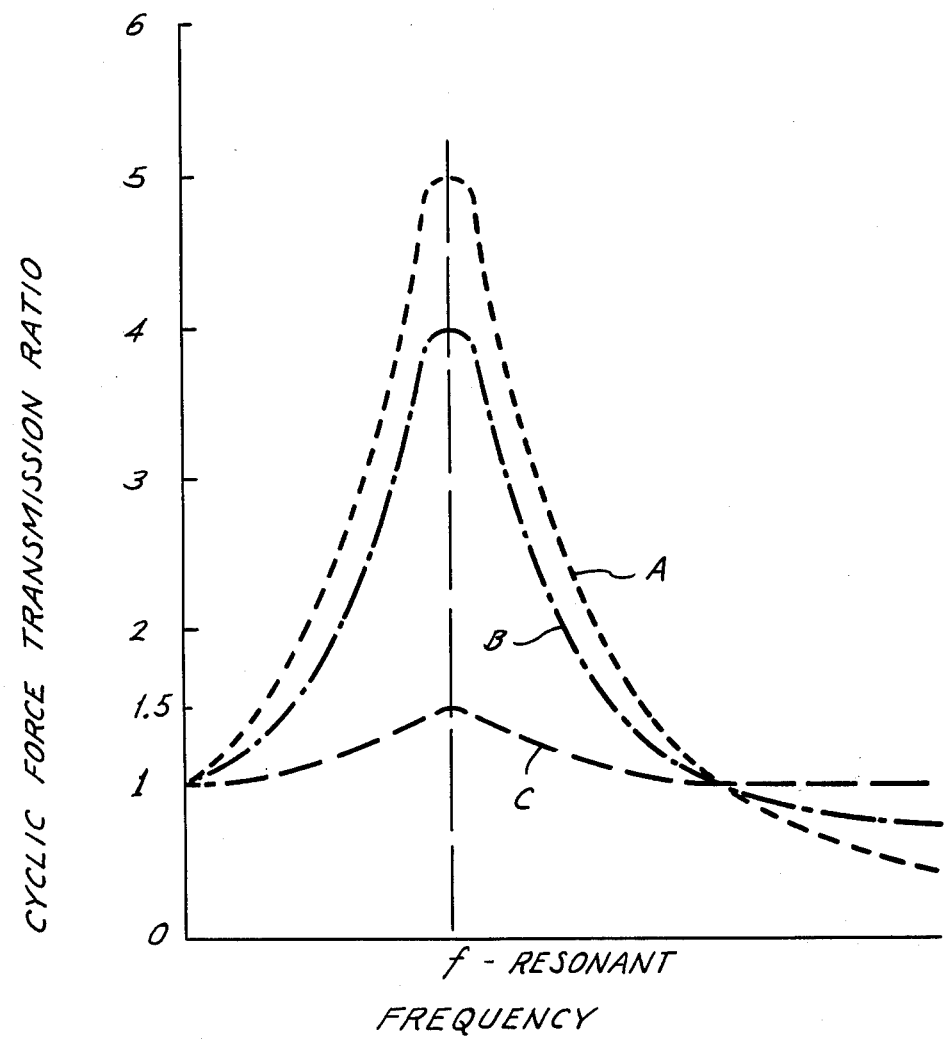

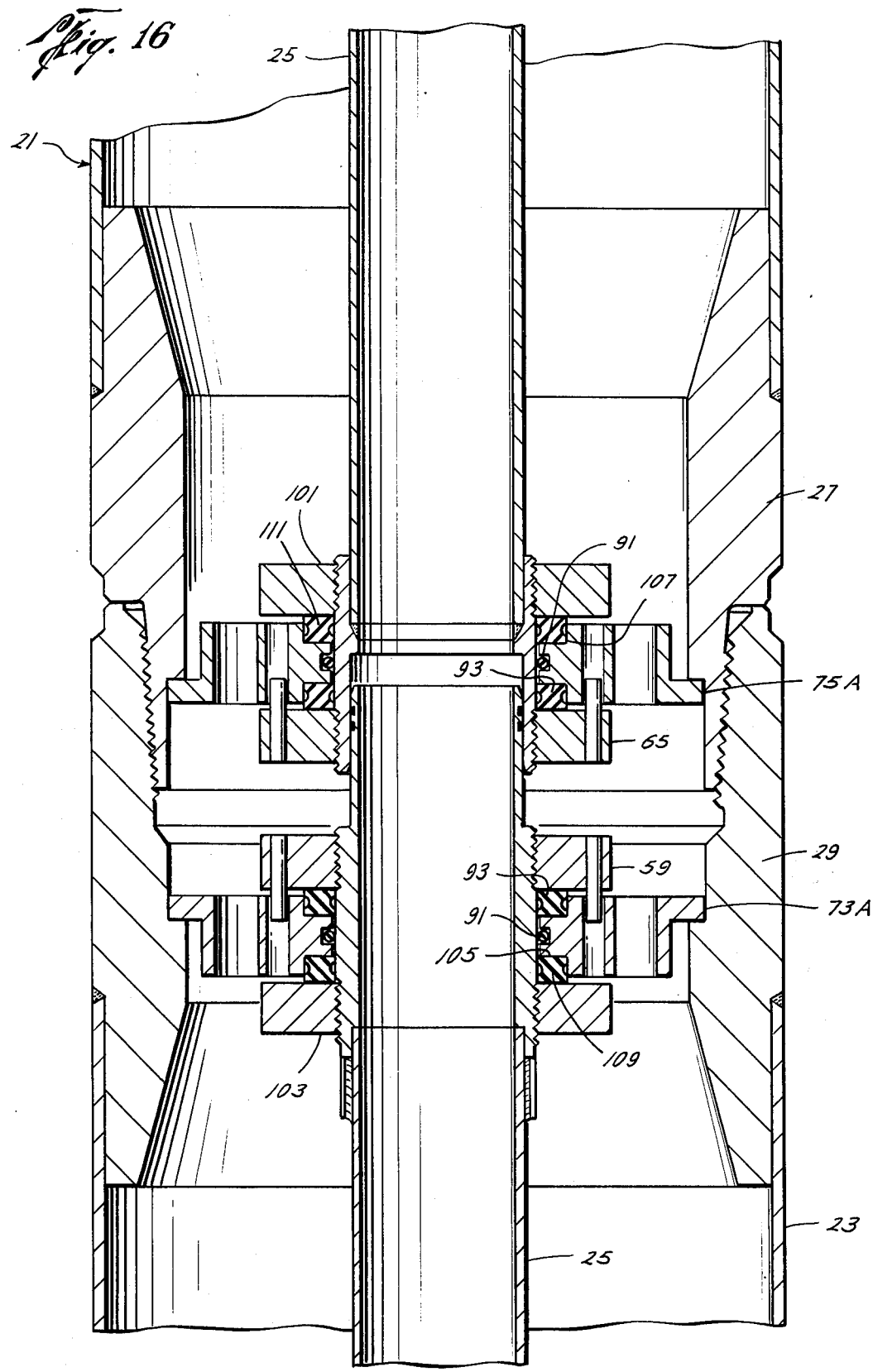

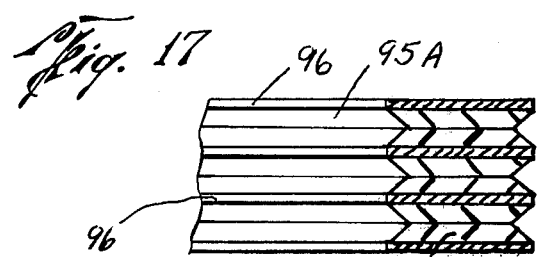
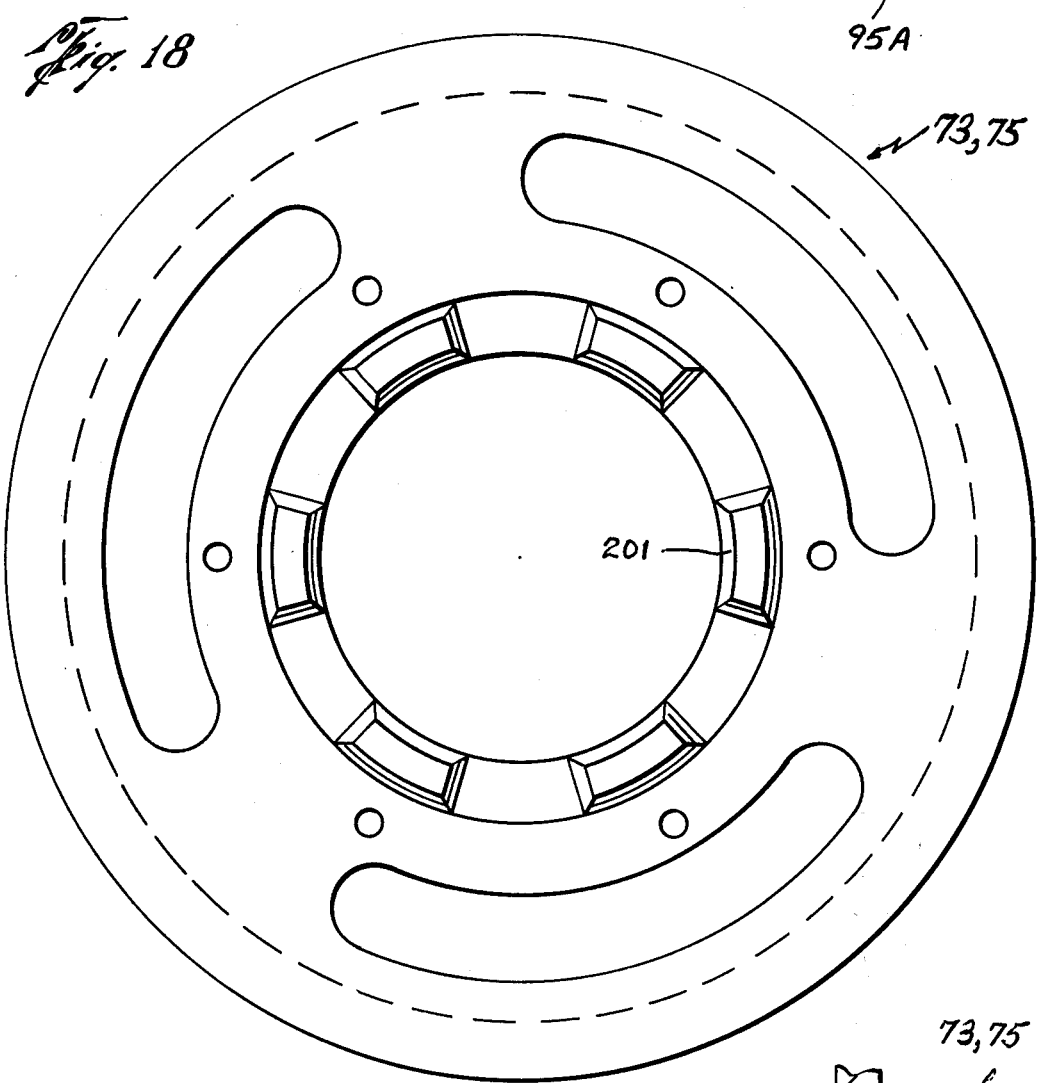
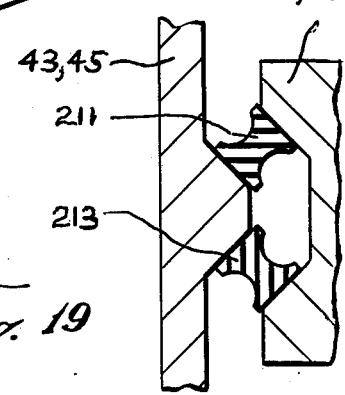

DUAL FLOW PASSAGE DRILL STEM

BACKGROUND OF THE INVENTION

This invention pertains to dual flow passage conduit and more particularly to dual flow passage drill stem used for drilling holes in the earth.

An example of dual conduit drill stem is the construction disclosed in U.S. Pat. Nos.

2,657,016 — Grable
2,701,122 — Grable.

For various reasons difficulty is experienced maintaining the integrity of such dual conduit drill stem when used in long drill strings where severe tensile and compressive loads are encountered, or in large holes when the pipe is laterally unsupported and excessive bending moments are experienced, or in air drilling where there may be temperature differentials due to hot air from the compressor or severe vibration due to high rates of flow of drilling fluid. Under certain conditions the connections between the tube and pipe tend to break loose. In other cases, welds between the tube and the tube centralizers or between the tube and tube connectors fail. Similar problems may be experienced with fluid transmission lines due to rapid temperature changes, e.g., from night to day in the desert or in the arctic, or when carrying hot liquids.

One attempt at solving the problem is to leave the tube unconnected to the pipe except at a single point. Examples of this type of construction are shown in U.S. Pat. Nos.

1,862,260 — Edmunds
1,954,454 — McFarland
2,850,264 — Grable
3,208,539 — Henderson.

It has also heretofore been proposed to support the tube within the pipe of dual flow passage drill stem by means of elastomeric supports at one end of the inner tube as disclosed in the U.S. Pat. No.

3,273,660 — Jackson et al and in U.S. Pat. application Ser. No. 643,254 — Kellner et al filed Dec. 22, 1975, assigned to the same assignee as the present application. The elastomer supports in the Jackson patent and in the prior Kellner et al application are of the shear type wherein the elastomer disposed between inner and outer cylindrical surfaces coaxial with the tube, is placed in shear when the tube moves axially. In the case of the Jackson patent, heavy elastomer ribs between pipe and tube provide a releasable support to enable single flow passage drill stem to be converted to dual flow passage drill stem. In the case of the Kellner et al application, the conduit is intended primarily for horizontal boring. Also compare the construction of U.S. Pat. No.

1,868,400 — Stover wherein elastomer seals are compressed between adjacent tube ends.

Other forms of dual conduit drill stem are known in which the tube is provided with connectors having inwardly facing shoulders engaging outwardly facing shoulders in the tool joints forming the pipe connectors. See for example U.S. Pat. No.

1,981,863 — Harris.

In the Harris construction the tube is placed under slight axial tension by screwing the box tube connector onto the tube.

A construction in which the tube is releasably connected to the pipe at both ends and is preloaded in compression therebetween is shown in U.S. Pat. No. 3,471,177 — Garrett et al.

In the pending U.S. Pat. application Ser. No. 535,193 — Olson filed Dec. 23, 1974, assigned to the same assignee as the present application, there is disclosed a construction which the tube is rigidly connected to each end of the pipe but the tube is parted intermediate its ends, the two parts being connected by a resilient coupling which serves to dampen vibrations as well as preventing undue load stress on the tube. In this regard it is to be noted that in all rotary drilling operations the drill stem is subjected to axial vibration. Such vibration may be induced by the bit as it repeatedly rotates past a particular high obstruction in the bottom of the hole, or by the teeth of rolling cutters successively impacting the bottom of the hole, or by impact imparted to the drill by a motor as in hammer drills and vibratory drills.

In connection with vibratory drilling of fairly large diameter, relatively shallow holes for posts for supporting the trans-Alaska pipe line, difficulty was experienced with dual conduit drill stem of the type employing a tube rigidly connected to the pipe at both ends. The welds holding the tube connectors to the tube failed. It was not known what was the cause of the problem, e.g. temperature differential expansion, or differential loading, fatigue failure, or resonant force build-up, or some other factor such as low temperature or a combination of several factors.

SUMMARY OF THE INVENTION

The construction disclosed in the present application was proposed in Sept. 1975 as a solution for the problem. A contract to build drill stem in accordance with this proposal was made in 1975. A first delivery of drill stem constructed in accordance with the proposal was made later in 1975 and after trial was found to be satisfactory.

According to the invention, the tube of a dual conduit drill stem is supported axially in the pipe by elastomer mountings of the compression type, at each end of the tube, and is supported radially by elastomeric, e.g. rubber, O-rings, at each end of the tube. Preferably the axial support mountings, and also the radial support O-rings are made of an elastomer, e.g. neoprene, which has a nearly flat curve of force transmission versus frequency, e.g. with a peak of not over 1.5 to 1 at resonant frequency. Preferably the resonant frequency of the elastomer mounted tube is different from the expected applied frequency of the motor or bit, but with a proper selection of the elastomer this is not critical. The elastomer mountings are preloaded in compression. This is to maintain compression at both mountings when the drill stem is placed in vertical position. Vertical dispostion of the drill stem imposes the weight of the tube on the mounting at one end and relieves it at the other. Preloading prevents one elastomer mountings act as vibration dampers, decoupling the tube and pipe so that excessive vibrations do not build up in the tube.

Each mounting comprises an annular spider loosely disposed around one of the tube connectors and seated in an outwardly facing shoulder of one of the pipe connectors, i.e., tool joints. An O-ring at the inner periphery of the spider engages the outer periphery of the tube connector and provides resilient radial support. Each mounting further includes a flange on the tube connector outwardly of the spider. The flange on the pin tube connector is integral with the pin tube connector. A screwed on flange on the box tube connector is secured in place by temperature releasable cement, e.g. epoxy. Between the spider and flange of each mounting is an elastomer ring disposed in an annular rabbet in the spider. This provides resilient axial support for the tube. During assembly the axial support elastomer rings are preloaded in compression to a much greater load than that imposed by the weight of the tube, e.g. ten times as much. The elastomer rings are split so as to be field replaceable. Releasable pins prevent relative rotation of the flanges and spiders. The spiders are shrink fitted in the tool joints so that when the flanges are pinned to the spiders the tube and threaded flange cannot rotate relative to each other; this prevents the tube and threaded flange from unscrewing.

BRIEF DESCRIPTION OF THE DRAWINGS

For a detailed description of a preferred embodiment of the invention, reference will now be made to the accompanying drawings wherein:

FIG. 3 is an end view of the pin tubing connector for the drill stem shown in FIGS. 1 and 2, FIG. 4 is an axial section thereof, and FIG. 5 is a fragmentary axial sectional view to a larger scale showing one of the seal ring grooves around the connector pin and the seal ring in the groove;

FIG. 7 is a fragmentary axial sectional view to a larger scale showing the detail of the external thread therearound;

FIG. 10 is a fragmentary axial section to an enlarged scale showing the detail of the thread thereof;

FIG. 15 is a graph;

FIG. 16 is an axial section similar to FIG. 2 showing a modification;

FIG. 17 is a fragmentary sectional view through an elastomer ring showing a modification;

FIG. 18 is an end view of one of the spiders, similar to FIG. 11, showing a modification, and FIG. 19 is a sectional view through an axial support means showing a modification.

DESCRIPTION OF PREFERRED EMBODIMENT

General Construction

Figure 1:
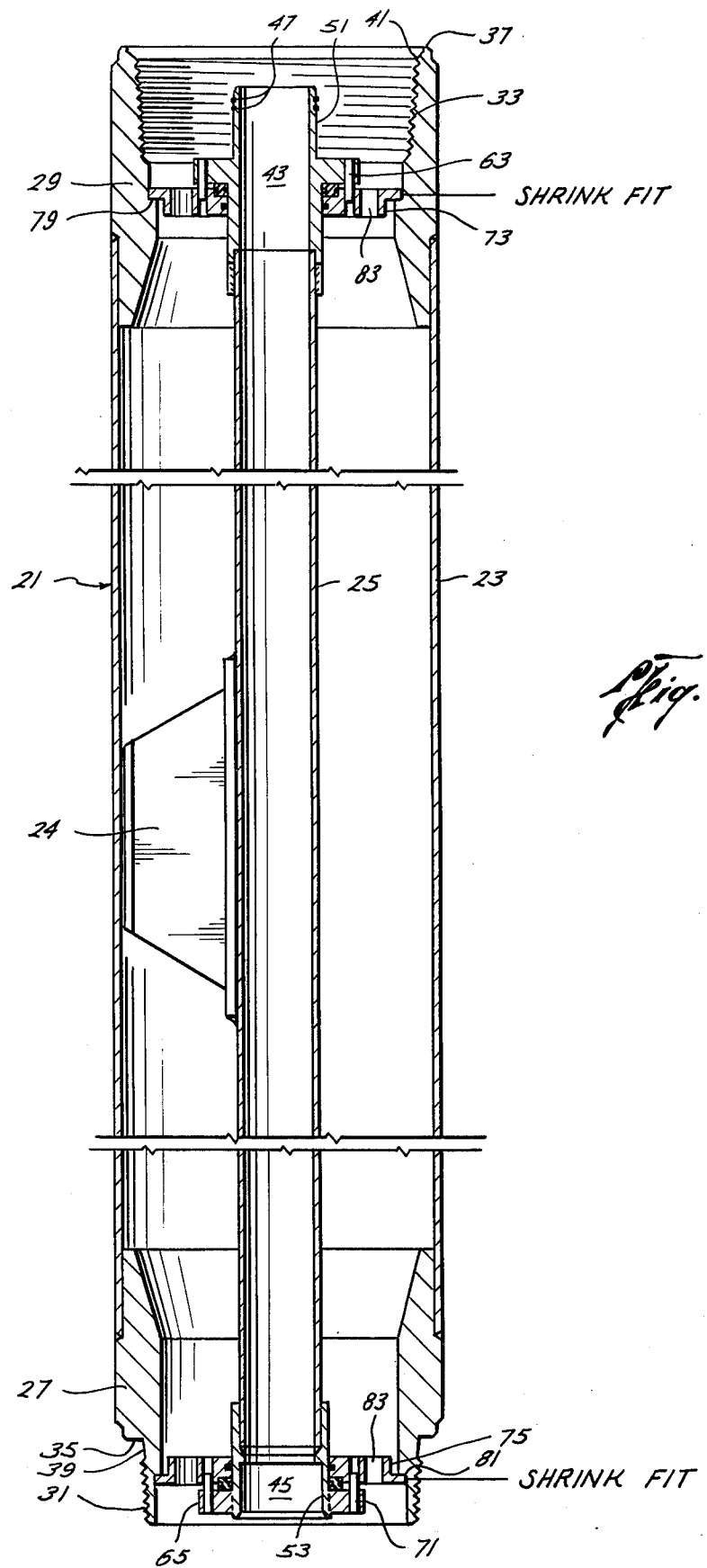
FIG. 1 is an axial section through a joint of drill stem embodying the invention.

Referring now to FIG. 1, there is shown a length of dual flow passage drill stem 21 comprising a pipe 23 and a tube 25 disposed substantially concentrically therewithin. A plurality, e.g. three, of stabilizer ribs 24 are welded to the outer periphery of tube 25. The ribs 24 are spaced apart axially along the length of the tube and each is displaced azimuthally, e.g. by 120° from adjacent ribs. The rib radii are only slightly smaller than the inner radius of pipe 23, thereby limiting radial movement of the tube inside the pipe.

Welded to the ends of the pipe are pin and box tool joints 27, 29 adapted to make rotary shouldered connections with correlative joints on adjacent lengths of drill stem or with a drill bit or a drilling machine. The tool joints are provided with correlative tapered threads 31, 33 and sealingly engageable shoulders 35, 37. There are unthreaded areas 39, 41 between the threads and shoulders. For further description of rotary shouldered connections see U.S. Pat. No.

3,754,609 — Garrett assigned to the same assignee as the present application.

Welded to the ends of the tube 25 are pin and box connectors 43, 45 for making telescopic connection with correlative connectors on adjacent lengths of drill stem or with a drill bit or a drilling machine.

Figure 2:
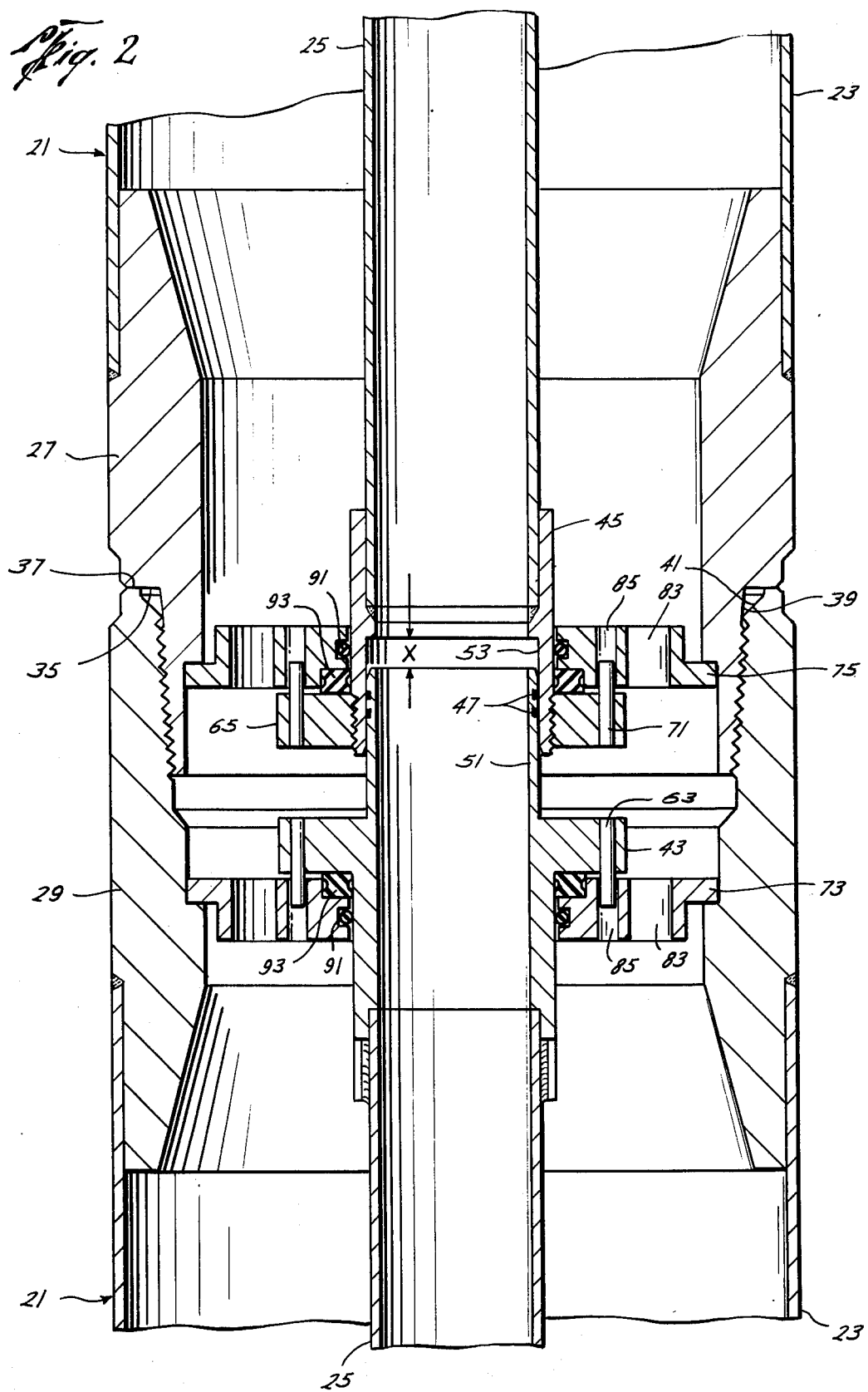
FIG. 2 is an axial section through the connection between two joints of drill stem embodying the invention.
Figure 6:
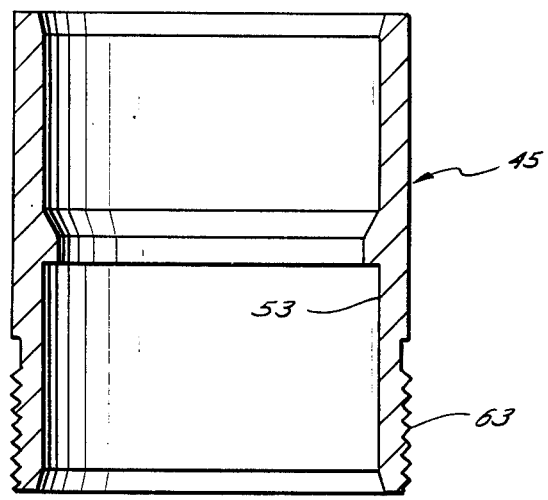
FIG. 6 is an axial section showing the box tubing connector for the drill stem shown in FIGS. 1 and 2.
Figure 8:
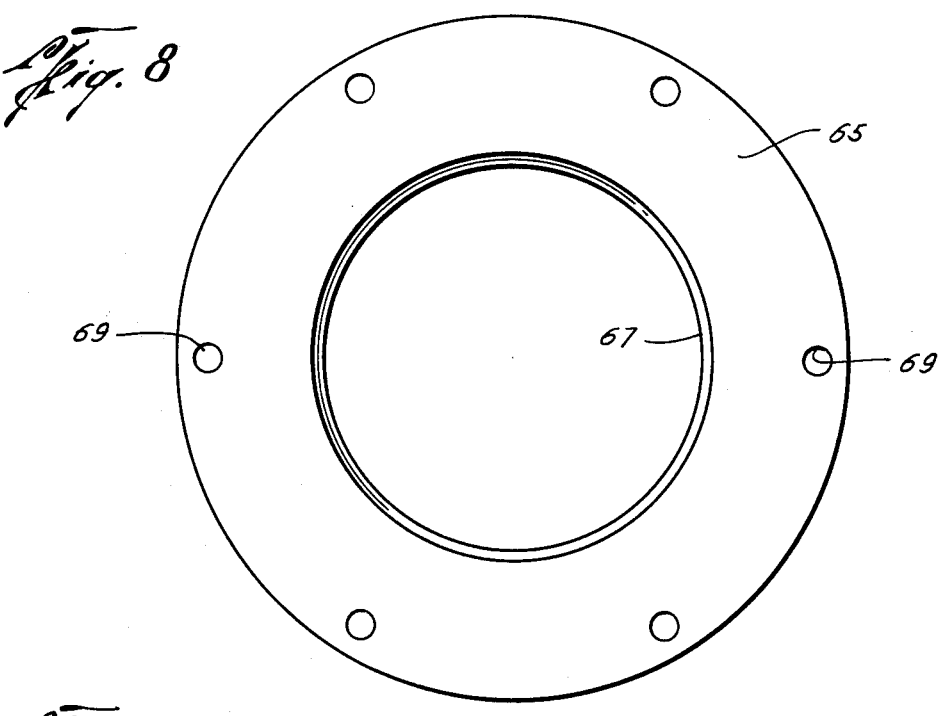
FIG. 8 is an end view of the threaded flange for the drill stem shown in FIGS. 1 and 2.
Figure 9:
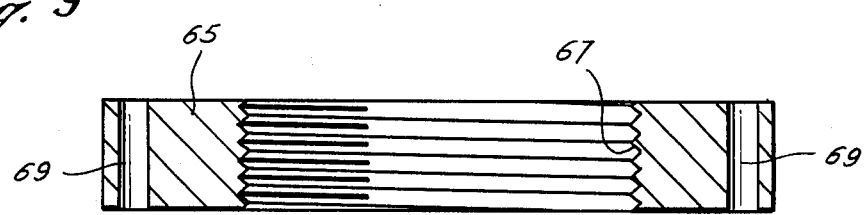
FIG. 9 is an axial section therethrough.

Referring now also to FIGS. 4 and 5, a pair of elastomeric O-rings 47 are disposed in a pair of trapezoidal cross section grooves 49 around the pin on the pin connector. The O-rings are of larger rod diameter than the depth of the grooves so as to protrude therefrom. The trapezoidal cross-section provides space for the O-ring elastomer to flow into when it is radially compressed, as shown in FIG. 2, by insertion of pin 51 into a correlative box such as 53 (see also FIGS. 1 and 6) having a smaller inner diameter than the torus outer diameter of the unstressed O-ring. As shown in FIGS. 3 and 4, the inner end 55 of the pin connector is provided with a number, e.g. four, of axially extending slots 57 equiangularly spaced apart. After the connector end 55 is slipped over one end of tube 25 during assembly, the slots are filled with weld material and a ring of weld metal is placed around the extremity of the end 55.

Connector pin 43 is provided with an integral radial flange 59 having a plurality, e.g. six, of holes 61 therethrough adapted to receive locking pins 63 (see FIG. 1).

Referring now to FIGS. 6-10, as well as FIG. 1, the box connector 45 is externally threaded at 63 to receive flange 65 which is internally threaded at 67. Threads 63, 67 are straight threads, i.e. untapered, and of stub Acme profile, see FIGS. 7 & 10, four threads per inch, providing a course rugged thread analogous to a tool joint thread. They are thus adapted for repeated make up and break out as may be required for replacement of the elastomer supports to be described in more detail hereinafter. Flange 65 is povided with a plurality, e.g. six, of holes 69 extending parallel to the axis thereof adapted to receive locking pins 71 (see FIG. 1).

Figure 11:
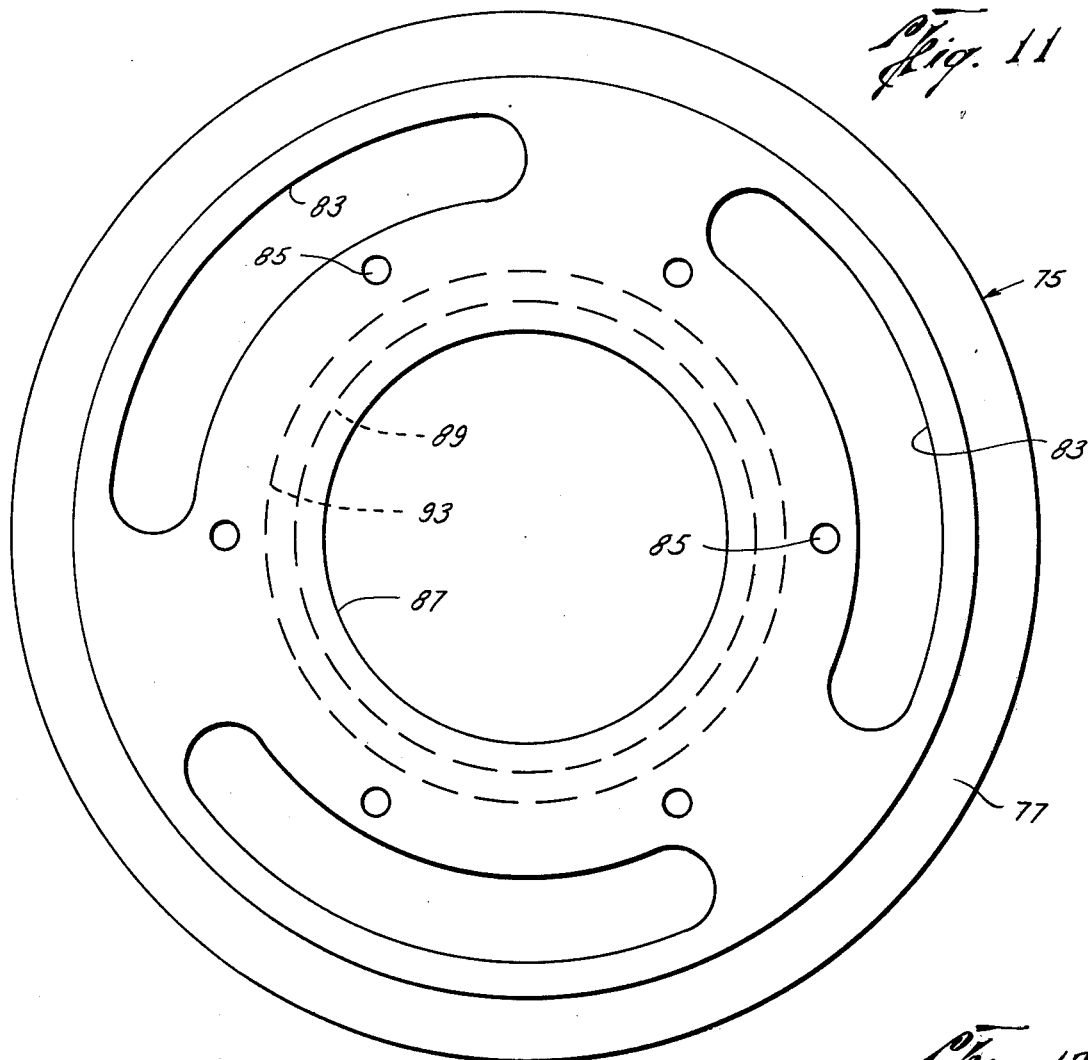
FIG. 11 is an end view of one of the spiders for the drill stem shown in FIGS. 1 and 2.
Figure 12:
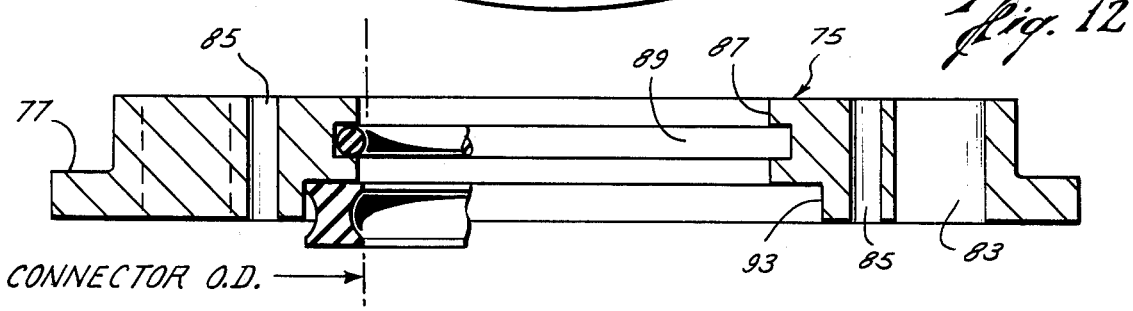
FIG. 12 is an axial section thereof.

Referring now to FIGS. 1 and 11-12, at the ends of pipe 23 within the tool joint thereat are spiders 73, 75. The spiders 73, 75 are identical. Each spider has an annular peripheral shoulder 77 adapted to seat on one of the tool joint shoulders 79, 81. The unstressed outer diameter of each spider is slightly larger than the inner diameter of the portions of the tool joints adjacent shoulders 79, 81, so that the spiders make an interference fit therein preventing rotation of the spiders within the tool joints. The spiders are shrink fitted into the tool joints, providing a releasable connection.

Arcuate slots 83 provide flow passages through the spiders. Each spider is provided with a plurality, e.g. six, of holes 85 extending parallel to the axis thereof. These holes are adapted to receive and make a loose fit with locking pins 63, 71 driven through the flanges, thereby to prevent relative rotation of the flanges and spiders without restraining relative axial motion thereof. Such relative axial motion is restrained by the axial elastomer supports described in more detail hereinafter.

Figure 13:
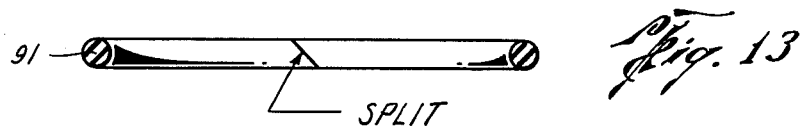
FIGS. 13 and 14 are sectional views through the radial and axial elastomer support rings for the drill stem shown in FIGS. 1 and 2.

The spiders are provided with central openings 87 of slightly larger diameter than the outer diameters of the connectors so as to fit loosely therearound, as shown in FIG. 1. The inner periphery of each spider is provided with a groove 89 of rectangular cross section to receive a split elastomer O-ring 91. (See also FIG. 13). Groove 89 has a width slightly greater than its depth so that O-ring 91, which has a diameter equal in width to the groove, protrudes slightly therefrom. (See FIG. 12). The inner torus diameter of O-rings 91 is slightly smaller than the outer diameter of the connectors so that the O-ring is slightly compressed when the connectors are stabbed therethrough. O-rings 91 provide resilient radial support for connectors 43, 45 and hence for tube 25.

Figure 14:
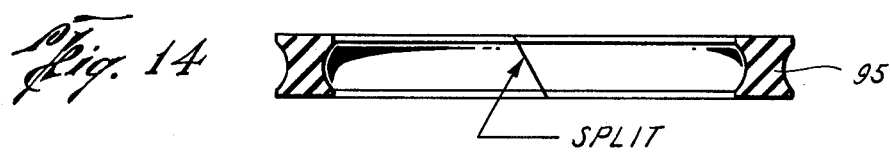

Each spider is provided on its outer face with an annular rabbet 93. Within rabbets 93 are disposed split elastomer hour-glass rings 95 (FIG. 14). The maximum outer diameter of each hour-glass ring is only slightly smaller than the maximum inner diameter of each rabbet so as to fit snugly therein. The maximum inner diameter of each hour-glass ring in unstressed condition is slightly smaller than the minimum inner diameter of each rabbet and only slightly larger than the outer diameter of the adjacent connector so as to fit snugly therearound but not with interference. The hour-glass rings therefore do not grip the connectors as do the O-rings, so that the function of radial support is left to the O-rings, and the hour-glass rings are free to act independently in their axial support function.

The height of each hour-glass ring is, e.g. by a ratio of 8 to 5, greater than the depth of each rabbet, so that when unstressed the hour-glass rings protrude axially beyond the spider rabbets (see FIG. 12). When made up as shown in FIG. 1, the hour-glass rings are axially compressed, rubber flowing into the necks of the hour-glass cross-sections.

ASSEMBLY

To assemble the subject drill stem, the tool joints are welded to the pipe. The stabilizer ribs are welded to the tube. The box connection is welded to one end of the tube. Lock pins 63 are driven through the pin connector flange. A spider with O-ring installed is placed around the pin connector in register with the lock pins. The pin connector is welded to the other end of the tube. The box end of the tube is stabbed into the pipe through the box tool joint. The ribs on the tube, being spaced axially, permit the tube to pass even though the minimum box tool joint inner radius is less than the radius of a rib.

The box tool joint is heated to expand it enough to allow entry of the spider on the pin tube connector which is then seated against the shoulder in the box tool joint and held there while the box tool joint cools and shrinks to grip the stabilizer tight enough to keep it from rotating relative to the box tool joint.

A spider with O-ring installed is placed over the box connector and shrink fitted within the pin tool joint while seated against the shoulder therein, in the same manner as just described for the spider in the box tool joint.

An hour-glass ring is placed between the pin connector flange and spider 73, the flange and spider are clamped together in metal to metal engagement with three or more C clamps extending through slots 83, the hour-glass ring being compressed between the flange and spider. An hour-glass ring is placed in the spider 75 around the box connector. Thermally releasably cement such as epoxy is applied to the threads 63, 67 of the threaded flange and box connector. The threaded flange is screwed onto the box connector until the space between threaded flange and spider is a predetermined amount, e.g. one quarter inch. Lock pins 71 are driven through the threaded flange into the adjacent spider. The C clamps are removed. The tube shifts axially until there is about one-eighth inch clearance between flange and spider at each end. This results in a preload of the tube in tension of about 8000 pounds. This is over ten times the weight of the tube, which will be less than 500 pounds (e.g. 30 ft. at 15 pounds per foot). Therefore the axially supporting hour-glass rings will both remain compressed even when the drill stem is vertical. This insures that both ends of the tube are axially restrained at all times.

DISASSEMBLY

If, after use, the elastomer support rings show signs of wear, e.g. if the flange and spider at either end approach too closely or the tube moves laterally into contact with the spider, the drill stem can be disassembled and the elastomer support rings replaced. The seal rings on the end of the pin connector can be replaced without disassembly of the drill stem beyond disconnecting the joint from the adjacent drill string member (bit, drilling machine, or another joint of drill stem).

To disassemble the drill stem for support ring replacement, the lock pins are driven out of the threaded flange. The box connector is heated, e.g. to 300° F., and the threaded flange is unscrewed. The axial support ring (hour-glass ring) in the spider supporting the box connector is then accessible and is replaced. By pulling the tube partly out of the box end of the pipe, the integral flange on the pin connector moves away from the spider in the tool joint pin so that the axial support ring at that end can be replaced. If the radial support O-rings need to be replaced, the tube can be pulled out of the spiders far enough to allow access to the inner periphery of the spider for replacement of the radial support rings. The drill stem can then be reassembled as before.

USE AND OPERATION

When in use the ends of the drill stem will be connected to other drill stem members, e.g. a bit, or a drilling machine, or another joint of drill stem, the latter connection being illustrated in FIG. 2. As there shown, the pin tool joint 27 of one length of drill stem is made up in the box tool joint 29 of another length of drill stem, the joints being made up tight enough so that there is considereable strain in the unthreaded portions 39, 41 and considerable pressure at the engaged shoulder surfaces 35, 37. This results in the connection staying tight despite axial vibratory stresses and in any torque being transmitted frictionally through the shoulders 35, 37 rather than through the tool joint threads.

When the tool joints are made up the tube connector pin 51 telescopes into the adjacent tube connector box 53 but does not bottom therein, there being an axial clearance X between the end of the pin and the bottom of the box. There is like clearance between the tube connector box and pin at the other end of each of the joints of drill stem 21, so that each tube 25 is free at both ends to move axially relative to pipe 23 to the extent permitted by the axial support elastomer rings 93. This in in contrast with certain prior constructions in which the tube was rigidly attached to the pipe at one or both ends, and other prior art structures in which the tube was resiliently supported at one end and completely free for axial motion at the other end. Nothing in the prior art is believed to show resilient support of the tube at both ends.

As previously noted, the axial support elastomer rings 93 are preferably of hour-glass cross-section. This shape maximizes cylic life of the elastomeric element. In addition, the elastomer preferably chosen for the axial support rings or pads 93, and also, for the radial support rings 91, is neoprene. FIG. 15 shows schematically the curves of cyclic force transmission ratio versus frequency for three different elastomers A, B, and C. Elastomer C is neoprene. Note that Curve C is much more nearly flat than that for the other elastomers, and in particular note that there is only a very low peak at the axial resonant frequency of the elastomer mounted tube. Even at resonant frequency the ratio for neoprene, with an hour-glass cross section, is only 1.5 to 1. Preferably the resonant frequency of the tube system is above or below the expected frequency of the applied forces from drilling e.g. 600 to 1200 cpm for a vibratory drill or 1200 to 1800 cpm for a hammer drill, but with a flat response elastomer such as neoprene for the mounting rings, this is not criticl, for the elastomer damps out the vibrations adequately at all frequencies. As distinct from the previously used Alaskan construction the force transmitted from the pipe to the tube through the elastomer mountings is insufficient to break the welds between the tube and its connectors or to cause failure at any other point or to exceed the endurance limit of the structure with respect to fatigue.

The elastomer support rings, both axial and radial, preferably should have a durometer hardness of the order of 60 on the Shore A scale, e.g. in the range of 30 to 80. Using an elastomer of such fairly high elastic modulus, there will be only a slight axial shift of the tube relative to the pipe when the drill stem is moved from horizontal to vertical position.

MODIFICATIONS

Referring now to FIG. 16, there is shown a modified form of the invention. Except as noted hereinafter, the structure of FIG. 16 is the same as that of FIG. 2, and like reference numbers used for like parts which need not be further described.

In the FIG. 16 construction, both outer flanges 59 and 65 are screwed on. In addition, each tube connector is provided with an inner screwed on flange, as shown at 101, 103. Each spider 73A, 75A is thicker than in the FIG. 2 embodiment, providing room for additional annular rabbets 105, 107. Within rabbets 105, 107 are received additional split, axial support, hour-glass, elastomer rings 109, 111. Rings 109, 111 are the same as rings 93 shown in FIG. 14. All four elastomer rings will be precompressed by screwing the adjacent flanges toward the spiders. This construction and method of precompression of the elastomer support rings does not create any preload in the tube or pipe. The tube is held against turning by virtue of the spiders being pinned to the outer flanges with lock pins, and the flanges are kept from unscrewing by being cemented to the connectors with temperature releasable cement, as in the FIG. 2 construction. If desired, locking pins may be provided for the inner flanges also, similar to those employed for the outer flanges. In the case of the last to be made up of the inner flanges, the pins would be driven in place through the holes in the spider.

In assembling the construction of FIG. 16, both tube connectors with their inner flanges already screwed on, would be welded to the tube. Then the entire subassembly at either end of the tube could be completed. In other words, at one end of the tube the spider and elastomer supports and O-ring would be slipped over the connector adjacent the flange, and the outer flange then screwed on. Both flanges would be tightened toward the spider until the desired precompression of the elastomer axial supports is effected. The tube would then be inserted in the pipe and the spider shrink fitted in place in the tool joint. At the other end of the tube the spider and elastomer support and O-rings would be slipped over the connector and shrink fitted into place in the tool joint. The inner flange would be screwed toward the spider, working through the spider slots, and then the outer flange would be screwed on, thereby precompressing both the elastomer support rings. The inner flanges may be provided with any desired shape or means to facilitate make up.

In the FIG. 16 construction there will be an axial support elastomer ring underneath a tube connector flange at each end of the tube when the drill stem is placed in a vertical position, and this will hold true regardless of which end of the drill stem is uppermost.

In both the FIG. 2 and 16 embodiments of the invention, although preloading of the axial support rings is desirable in order to prevent separation from the flange when the pipe is vertical, the preload should not be so great as to cause the hour-glass shape to be changed completely to rectangular. It is desired that there remain space for the rubber to flow into the annular space about the hour-glass shape upon further compression. Absent such space the elastomer would act like a confined body of liquid, with reduced damping effect.

Other shapes than simple hour-glass cross-section may be employed, e.g. as described in circular #3561-G of National Casting's Division, Midland-Ross Corp., the disclosure of which is incorporated herein by reference. This element is also used for springs in off-highway vehicles and has been described in SAE Bulletin #700-738 entitled "Elastomeric Suspension With Geometric Spring Rate for Off-Highway Vehicles" by James McClelland, Unit Rig Inc., Tulsa, Oklahoma, the disclosure of which is incorporated herein by reference. FIG. 17 illustrates one such modification in which there are a plurality of trapezoidal cross-section elastomer rings each bonded to one side of a flat ring or washer 96 and stacked together to form an elastomeric support means.

Instead of annular supports, a plurality of separate annularly disposed pads 201 could be used, as shown in FIG. 18, the pads being bonded to a spider for example.

If desired, the construction shown in FIG. 19 can be pre-loaded by structure analogous to those earlier described. This construction eliminates the need for separate radial support means, e.g. "O"-ring 91.

Although the invention has been described with reference to dual flow passage pipe, it is apparent that the invention is also applicable to the mounting of an inner tube or other elongated member within an outer tube or pipe wherever the use of the structure subjects it to vibratory or other stress similar to that encountered in dual conduit drill pipe. The construction may also be useful to mount an inner elongated member within a pipe in a resilient manner even though the particular structure is not normally subjected to any special stress during use.

While a preferred embodiment of the invention and several embodiments thereof heave been shown and described, many other modifications thereof can be made by one skilled in the art without departing from the spirit of the invention.

We claim:

1. Dual tube drill stem comprising pipe means including connection means at each end thereof for making connection with other drill string members,
    tubular means having ends adapted for making connection with other drill string members, said tubular means being disposed within the pipe means and extending longitudinally through the inside of the pipe means from one end of the pipe means to the other providing an imperforate wall fluid passage inside the tubular means from adjacent one end of the pipe means to the other and
    support means within the pipe means positioning the tube means within the pipe means and placing the entire length of the tubular means in radially spaced relationship with respect to said pipe means, providing an imperforate wall fluid passage therebetween extending past said support means from said one end of the pipe means to the other,
    said support means including elastomer sandwich means comprising a first annular surface on the interior of the pipe means, a second annular surface on the exterior of the tube means, and annularly disposed elastomer means disposed between said surfaces,
    each of said surfaces when resolved into any components facing axially and radially including at least some axially facing component, whereby said elastomer means provides axial support for the tube means within the pipe means and said elastomer means is compressed upon relative axial movement of said pipe means and tube means in the direction bringing said surfaces closer together,
    said drill stem being free of stop surfaces which would prevent limited relative axial movement of said tube means and pipe means in one axial direction and also free of stop surfaces which would prevent limited relative axial movement of said tubular means and pipe means in the opposite axial direction.

2. Drill stem according to claim 1,
    said support means including further another elastomer sandwich means like the first said elastomer sandwich means and adjacent thereto but oppositely disposed so that the elastomer means thereof is compressed upon relative axial movement of said pipe means and tube means in the opposite direction from said one direction.

3. Drill stem according to claim 2,
    said annular surfaces of each of said elastomer sandwich means when resolved into components facing axially and radially also including at least some radially facing component, thereby to provide radial support for said tube means, said support means including a certain amount of radial play between said surfaces of each sandwich retained by said elastomer of each sandwich.

4. Drill stem according to claim 2,
    said annular surfaces of each of said elastomer sandwich means facing axially,
    said support means further including radial support means adjacent said elastomer sandwich means,
    said radial supporting means comprising a radially supporting elastomer ring between the tube means and pipe means,
    said radial support means including a certain amount of radial play restrained by said radially supporting elastomer ring.

5. Drill stem according to claim 4,
    said pipe means including annular spider means around said connector means held against axial movement relative to said pipe means in at least one direction,
    said radially supporting elastomer ring being a split O-ring lying in an annular groove at the inner periphery of said spider and making an interference fit around the tube means.

6. Drill stem according to claim 5,
    there being two of said spiders and support means disposed one near each end of the drill stem,
    each elastomer sandwich means including two flanges screwed onto one of the connectors with one of said spiders extending between said flanges and said elastomer means being disposed on opposite sides of the spider between the spider and one of the flanges.

7. Drill stem according to claim 1,
    said elastomeric means having a multiple waist hourglass cross-section.

8. Drill stem according to claim 1,
    said elastomeric means comprising a plurality of circumferentially spaced pads having thicker bases than tops, the bases being bonded to one of said annular surfaces.

9. Drill stem according to claim 1,
    said elastomer means having a cyclic force transmission ratio versus frequency curve whose maximum ratio is less than 2.

10. Drill stem according to claim 1,
    said elastomer means being made of neoprene.

11. Drill stem according to claim 10,
    said neoprene having a durometer hardness on the Shore A scale of between 30 and 80.

12. Drill stem according to claim 1,
    said support means further including rib means fastened to said tube means radially positioning said tube means in said pipe means while allowing relative axial motion of the pipe means and tube means.

13. Dual tube drill stem comprising pipe means including connection means at each end thereof for making connection with other drill string members,
    tubular means having ends adapted for making connection with other drill string members, said tubular means being disposed within the pipe means and extending longitudinally through the inside of the pipe means from one end of the pipe means to the other providing an imperforate wall fluid passage inside the tubular means from adjacent one end of the pipe means to the other, and
    support means within the pipe means positioning the tube means within the pipe means and placing the entire length of the tubular means in radially spaced relationship with respect to said pipe means providing an imperforate wall fluid passage therebetween extending past said support means from said one end of the pipe means to the other, said support means including elastomer sandwich means comprising a first annular surface on the interior of the pipe means, a second annular surface on the exterior of the tube means, and annularly disposed elastomer means disposed between said surfaces, each of said surfaces when resolved into any components facing axially and radially including at least some axially facing component, whereby said elastomer means provides axial support for the tube means within the pipe means and said elastomer means is compressed upon relative axial movement of said pipe means and tube means in the direction bringing said surfaces closer together, said drill stem being free of stop surfaces which would prevent limited relative axial movement of said tube means and pipe means in one axial direction and also free of stop surfaces which would prevent limited relative axial movement of said tubular means and pipe means in the opposite axial direction, said support means including a plurality of said elastomer sandwich means disposed one near each end of the drill stem, said axially facing components of said surfaces of one of said elastomer sandwich means being directed oppositely to said axially facing components of the corresponding ones of said surfaces of the other of said elastomer sandwich means.

14. Drill stem according to claim 13,
said elastomer means each comprising an elastomer ring having bearing surfaces bearing against said annular surfaces and in between said bearing surface being narrower in cross-section than at said bearing surfaces.

15. Dual tube drill stem comprising pipe means,
tubular means within the pipe means extending longitudinally through the inside of the pipe means from one end of the pipe means to the other,
support means positioning the tube means within the pipe means,
said support means including elastomer sandwich means comprising a first annular surface on the interior of the pipe means, a second annular surface on the exterior of the tube means, and annularly disposed elastomer means disposed between said surfaces,
each of said surfaces when resolved into any components facing axially and radially including at least some axially facing component, whereby said elastomer means provides axial support for the tube means within the pipe means and said elastomer means is compressed upon relative axial movement of said pipe means and tube means in the direction bringing said surfaces closer together,
said drill stem being free of stop surfaces which would prevent limited relative axial movement of said tube means and pipe means,
said support means including a plurality of said elastomer sandwich means disposed one near each end of the drill stem,
said pipe means including a pipe with shouldered tool joints connected to the ends thereof,
said tube means including a tube with telescopic connectors connected to the ends thereof, the telescopic connections of the ends of the tube being free of axial stop surfaces which would prevent axial movement of the tube means when the drill stem is connected to a drill string member having correlative tool joints and connectors and the connected tool joints are made up into shoulder to shoulder engagement,
said pipe means further including an annular spider in each tool joint extending around the pipe means,
said tube means further including an annular flange around each connector alongside the spider at that end of the drill stem,
said annular surfaces of said elastomer sandwich means being provided on said spiders and flanges.

16. Drill stem according to claim 15,
said elastomer means being preloaded in compression with a force greater than the weight of the tube means.

17. Drill stem according to claim 15,
said flanges being disposed outwardly of said spiders,
at least one of said flanges being connected to the respective connector by a straight thread.

18. Drill stem according to claim 17,
said spiders being held against rotation about the pipe axis relative to said tool joints,
said flanges being releasably held against rotation about the pipe axis relative to said spiders, and
releasable means securing the threaded flange to the associated connector,
the other flange being secured to its associated connector to prevent motion thereof relative to the last said connector.

19. Drill stem according to claim 18,
said spiders being shrink fitted in said tool joints,
said flanges being held against rotation by drive pins, extending from said flanges to said spiders,
said threaded flange being releasably secured to the associated connector by thermally releasable cement.

20. Drill stem according to claim 19,
said other flange being integral with the respective connector.

21. Drill stem according to claim 20 in which the elastomer means are in precompression with a force of at least ten times the weight of said tube means.

22. Drill stem according to claim 17,
said elastomer means each comprising a split elastomer ring of hour-glass cross-section.

23. Drill stem according to claim 13,
said annular surfaces being directed axially,
said support means further including radial support means near each end of the drill stem providing radial support for the tube means,
each radial support means comprising a radial support elastomer ring between one of the spiders and the associated connector.

24. Drill stem according to claim 23,
each said radial support elastomer ring being an O-ring that is disposed in an annular groove at the inner periphery of the associated spider and protruding radially from the groove toward the associated connector and having an unstressed inner torus diameter smaller than that of the part of the associated connector in contact therewith.

25. Drill stem according to claim 24,
the elastomer of each elastomer sandwich means being disposed in an annular rabbet in the associated spider and having both a stressed and an unstressed thickness greater than the axial extent of said rabbet.

* * * * *

UNITED STATES PATENT OFFICE
CERTIFICATE OF CORRECTION

Patent No. 4,067,596            Dated January 10, 1978

Inventor(s) Jackson M. Kellner, Vincent Hugo Vetter

It is certified that error appears in the above-identified patent and that said Letters Patent are hereby corrected as shown below:

Column 2, line 59, after "one", insert --end of the tube from being left axially unrestrained. The--.
Column 4, line 51, change "povided" to --provided--.
Column 6, line 58, change "considereable" to --considerable--.
Column 7, line 5, change the first instance of "in" to --is--.
Column 7, line 14, change "cylic" to --Cyclic--.
Column 7, line 31, change "cirticl" to --critical--.
Column 9, line 8, change "heave" to --have--.
Column 12, line 46, change "13" to --15--.

Signed and Sealed this

Twenty-fourth Day of April 1979

[SEAL]

Attest:

RUTH C. MASON
Attesting Officer

DONALD W. BANNER
Commissioner of Patents and Trademarks